(12) United States Patent
Swab et al.

(10) Patent No.: US 8,123,081 B2
(45) Date of Patent: Feb. 28, 2012

(54) TWO COMPONENT FOAM DISPENSING APPARATUS

(75) Inventors: John H. Swab, Simpsonville, SC (US);
Matthew C. Dunlap, Taylor, MI (US);
Thomas M. Suggs, Southgate, MI (US);
Donald E. Weber, Livonia, MI (US)

(73) Assignee: BASF Corporation, Florham Park, NJ (US)

( * ) Notice: Subject to any disclaimer, the term of this patent is extended or adjusted under 35 U.S.C. 154(b) by 800 days.

(21) Appl. No.: 12/210,034

(22) Filed: Sep. 12, 2008

(65) Prior Publication Data

US 2010/0065130 A1    Mar. 18, 2010

(51) Int. Cl.
*B67D 7/78* (2010.01)
(52) U.S. Cl. ................................ 222/145.2; 239/112
(58) Field of Classification Search ............ 222/145.5, 222/1, 145.2, 54, 148; 137/170.1, 505, 511, 137/468; 239/112, 141
See application file for complete search history.

(56) References Cited

U.S. PATENT DOCUMENTS

| | | | |
|---|---|---|---|
| 334,011 A | 1/1886 | Franklin | |
| 2,411,392 A | 11/1946 | Saville | |
| 2,504,117 A * | 4/1950 | Downs | 427/280 |
| 2,872,939 A | 2/1959 | Terry | |
| 3,741,242 A | 6/1973 | Hansen et al. | |
| 3,795,364 A | 3/1974 | Kattner | |
| 3,882,052 A | 5/1975 | Raynor et al. | |
| 4,138,454 A * | 2/1979 | Harmon et al. | 264/39 |
| 4,234,007 A | 11/1980 | Titone | |
| 4,383,552 A | 5/1983 | Baker | |
| 4,913,317 A * | 4/1990 | Wernicke | 222/1 |
| 5,004,125 A * | 4/1991 | Standlick | 222/23 |
| 5,086,949 A * | 2/1992 | Vulpitta et al. | 222/1 |
| 5,104,006 A | 4/1992 | Brown | |
| 5,180,082 A * | 1/1993 | Cherfane | 222/145.2 |
| 5,246,143 A * | 9/1993 | Cherfane | 222/145.2 |
| 5,318,637 A * | 6/1994 | Wernicke | 134/22.11 |

(Continued)

FOREIGN PATENT DOCUMENTS

DE    2806102 A1    2/1978

(Continued)

OTHER PUBLICATIONS

U.S. Appl. No. 12/951,741, filed on Nov. 22, 2010, "Foam Dispensing Apparatus", 35 pages.

(Continued)

*Primary Examiner* — Lien Ngo
(74) *Attorney, Agent, or Firm* — Howard & Howard Attorneys PLLC

(57) ABSTRACT

A foam dispensing assembly comprises a dispensing head and a manifold assembly. The manifold assembly includes a purge portion for supplying a gas and a cleansing fluid to the dispensing head, a first supply portion for supplying a first fluid to the dispensing head and a second supply portion for supplying a second fluid to the dispensing head. Each of the purge portion, the first supply portion and the second supply portion include a plurality of check valves and flow control valves for controlling the flow of the first fluid, the second fluid, the gas and the cleansing fluid through the manifold assembly. Each of the first supply portion and the second supply portion include an integral flow control device for regulating a fluid flow rate to the dispensing head, and a thermometer for sensing the temperature of the first fluid and the second fluid respectively.

40 Claims, 6 Drawing Sheets

U.S. PATENT DOCUMENTS

| | | | |
|---|---|---|---|
| 5,360,831 A | 11/1994 | Lidy et al. | |
| 5,388,764 A | 2/1995 | Moses | |
| 5,403,088 A | 4/1995 | Killmer et al. | |
| 5,411,321 A | 5/1995 | Harness | |
| 5,878,766 A | 3/1999 | Dekhtyar | |
| 5,950,875 A * | 9/1999 | Lee et al. | 222/145.5 |
| 6,534,556 B2 | 3/2003 | Lacarte et al. | |
| 6,688,319 B2 | 2/2004 | Trantham et al. | |
| 6,797,736 B1 | 9/2004 | Smiecinski et al. | |
| 7,156,120 B2 | 1/2007 | Cherfane et al. | |
| 7,350,672 B1 | 4/2008 | Gerich | |
| 7,377,404 B2 * | 5/2008 | Cherfane | 222/145.1 |
| 7,717,059 B2 * | 5/2010 | Wanthal et al. | 118/669 |
| 7,954,673 B2 * | 6/2011 | Kosmyna et al. | 222/145.2 |
| 2003/0150872 A1 | 8/2003 | Huber et al. | |
| 2004/0124268 A1 | 7/2004 | Frazier et al. | |
| 2005/0103889 A1 | 5/2005 | Langeman | |
| 2006/0076064 A1 | 4/2006 | Carter | |
| 2007/0170282 A1 | 7/2007 | McMichael | |
| 2010/0065768 A1 | 3/2010 | Swab | |
| 2010/0069517 A1 | 3/2010 | Swab | |
| 2011/0121034 A1 | 5/2011 | Swab et al. | |

FOREIGN PATENT DOCUMENTS

| | | |
|---|---|---|
| DE | 2934825 A1 | 8/1979 |
| EP | 1353254 A2 | 10/2003 |
| EP | 1712821 A1 | 10/2006 |
| FR | 2535435 A1 | 5/1984 |

OTHER PUBLICATIONS

English language abstract for FR 2535435 extracted from espacenet.com database, dated Mar. 24, 2011, 12 pages.

The Dow Chemical Company, "Dow Polyurethane Systems Products"; The Dow Chemical Company website; www.dow.com/pusystems/product/deltagun.htm, accessed Jan. 28, 2008.

BASF Corporation, "BASF Polyurethanes—Building and Construction"; The BASF Corporation website; www.basf.com/urethanechemicals,Specialty_Systems/equipment_bc.html, accessed Jan. 28, 2008.

English translation of DE 2934825, extracted from espacenet.com, 17 pages.

English translation of DE 2806102 A1, extracted from espacenet.com, 22 pages.

PCT International Search Report PCT/EP2010/067929, dated Mar. 17, 2011, 6 pages.

* cited by examiner

TWO COMPONENT FOAM DISPENSING APPARATUS

BACKGROUND OF THE INVENTION

1. Field of the Invention

The subject invention generally relates to a foam dispensing apparatus for dispensing a mixture of a first fluid and a second fluid. More specifically, the subject invention relates to a manifold assembly for supplying the first fluid, the second fluid, a gas and a cleansing fluid to a dispensing head of the foam dispensing apparatus.

2. Description of the Related Art

Expanding chemical foam compositions, such as curable polyurethane foams, are presently well known and used in a number of different applications. Expanding chemical foam compositions are useful in such applications as thermal insulation, floatation, coatings and packaging. The curable foam compositions comprise a two-part composition, and in the case of polyurethane foams, one part of the composition includes a resin component and the other part includes an isocyanate component. The resin component typically includes a polyol component. Chemical foaming agents, curing agents catalysts or accelerators, as well as other modifying additives, may be incorporated into one or both of the foam components. These two-components of the foaming composition are separately stored in different containers until use.

In use, the two components of the foam composition are rapidly mixed together. A rapid cross-linking reaction and foam expansion commences, which ultimately yields a low density, but relatively high load bearing urethane rigid foam. The mixing of the resin component and the isocyanate component must occur at a proper flow ratio and mix under rapid and sufficient impingement mixing conditions to obtain a final acceptable product.

The urethane components, including the resin component and the isocyanate component, are stored under pressure in containers, which are attached to hand held dispensing assemblies (guns) by means of various hoses and couplings. The guns include a trigger operated dispensing head designed to permit the two-components of the foam composition to flow into a mixing chamber wherein the two components are rapidly mixed to form a reactive and expanding chemical foam composition, which exits through a foam discharge nozzle or opening. The trigger operated dispensing head may be manually controlled or electronically controlled.

The two components of the foam composition are highly chemically reactive and begin to form a cured polymeric product within a matter of seconds. Premature leaking and mixing of the two foam components within the dispensing assembly is a serious and major concern because leakage results in undesirable curing in the dispensing assembly, causing blockage and damage to dispensing assembly.

Referring to Prior Art FIG. 1, an example of a prior art dispensing assembly (gun) is shown. The dispensing assembly comprises a dispensing head, which dispenses the mixed foam composition. The dispensing assembly further comprises various pipe fittings and tubing to provide the two foam components to the dispensing head. Additionally, the dispensing assembly further comprises various pipe fittings to provide a flow of a gas, preferably but not limited to nitrogen, and a flow of a cleansing fluid, preferably but not limited to water, to the dispensing head. The gas is entrained within the foam components to assist in the formation of the expanded foam product and may be utilized to flush or clean the dispensing head. The cleansing fluid is also utilized to flush the remnants of the foam components from the dispensing head at the end of each use. The gas may be combined with the cleansing fluid to assist in cleansing the dispensing head. The various pipe fittings and components include on/off control valves, check valves, flow control valves, couplings, T-connectors, etc. Each of the connections between the various components is susceptible to leakage. Additionally, dispensing assemblies such as shown in Prior Art FIG. 1 are heavy and awkward to handle.

SUMMARY OF THE INVENTION AND ADVANTAGES

The subject invention provides a foam dispensing apparatus. The foam dispensing apparatus dispenses a mixture of a first fluid and a second fluid. The apparatus comprises a dispensing head. The dispensing head mixes the first fluid and the second fluid and dispenses the mixture onto a substrate. A handle extends from the dispensing head. The handle permits a user to grasp and manipulate the dispensing head for operating the dispensing head. A manifold assembly is mounted to the dispensing head. The manifold assembly comprises a purge portion, a first supply portion and a second supply portion. The purge portion of the manifold assembly defines a gas inlet, a cleansing fluid inlet, an outlet in fluid communication with the dispensing head, and a plurality of passageways interconnecting the gas inlet, the cleansing fluid inlet and the outlet. The purge portion of the manifold assembly supplies a cleansing mixture to the dispensing head. The first supply portion of the manifold assembly is mounted to the purge portion. The first supply portion defines a first material inlet for receiving the first fluid, a first material outlet coupled to the dispensing head for supplying the dispensing head with the first fluid and a first fluid passageway interconnecting the first material inlet and the first material outlet. The second supply portion of the manifold assembly is mounted to the purge portion. The second supply portion defines a second material inlet for receiving the second fluid, a second material outlet coupled to the dispensing head for supplying the dispensing head with the second fluid and a second fluid passageway interconnecting the second material inlet and the second material outlet.

Accordingly, the foam dispensing assembly of the subject invention includes the manifold assembly, which consolidates the supply feeds, e.g., the gas inlet, the cleansing fluid inlet, the first fluid inlet and the second fluid inlet, to the dispensing head. By consolidating the various supply feeds into the manifold assembly, the number of pipe connections in the dispensing assembly is greatly reduced, which significantly reduces the likelihood of developing a leak between connections. Additionally, by consolidating all of the supply feeds into the manifold assembly, the maneuverability of the foam dispensing assembly is greatly increased.

BRIEF DESCRIPTION OF THE DRAWINGS

Other advantages of the present invention will be readily appreciated, as the same becomes better understood by reference to the following detailed description when considered in connection with the accompanying drawings wherein.

Prior Art

DETAILED DESCRIPTION OF THE INVENTION

Referring to the Figures, wherein like numerals indicate corresponding parts throughout the several views, a foam dispensing apparatus is shown generally at 20.

Figure 1:
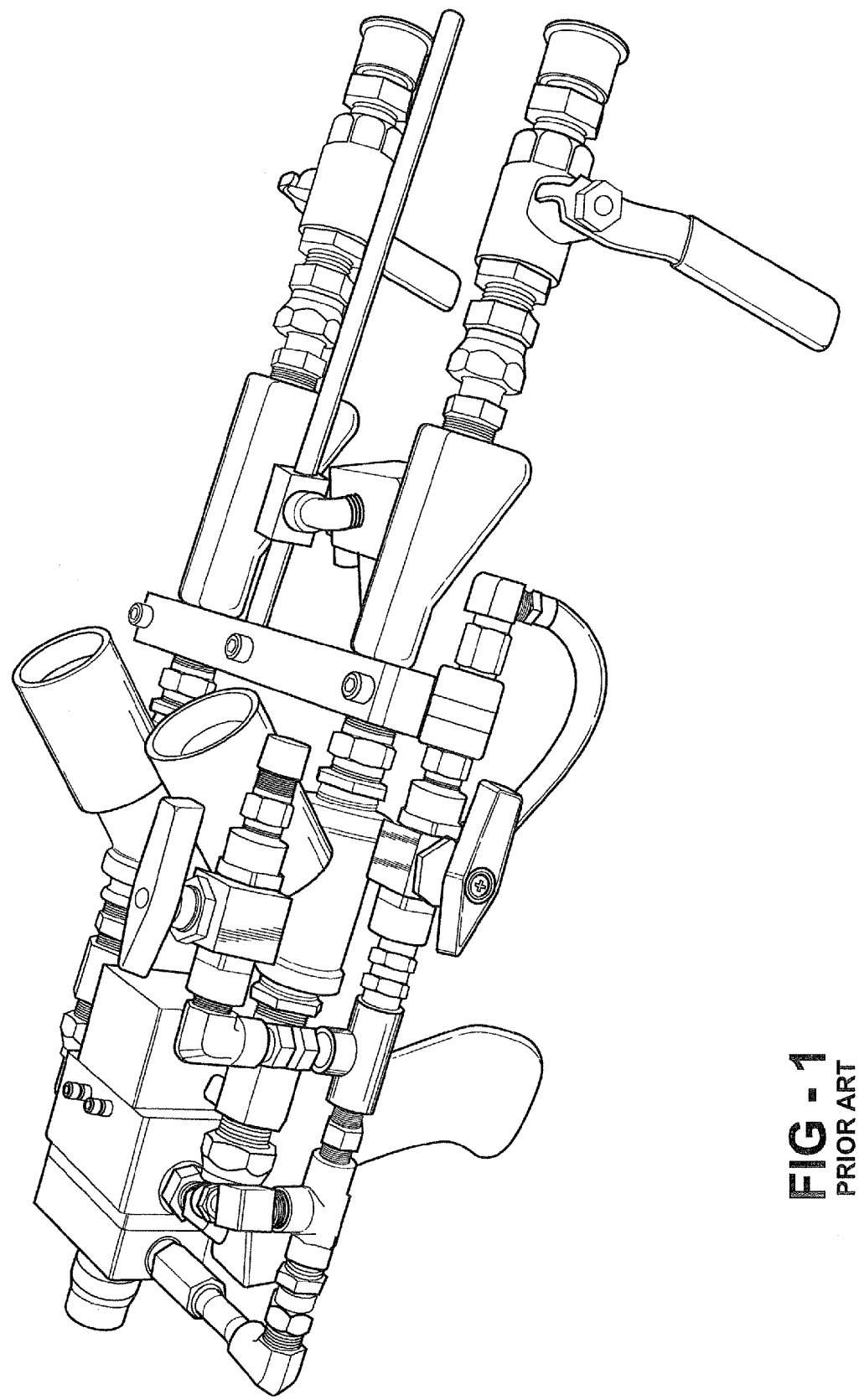
FIG. 1 is a perspective view of an example of a prior art foam dispensing assembly.
Figure 2:
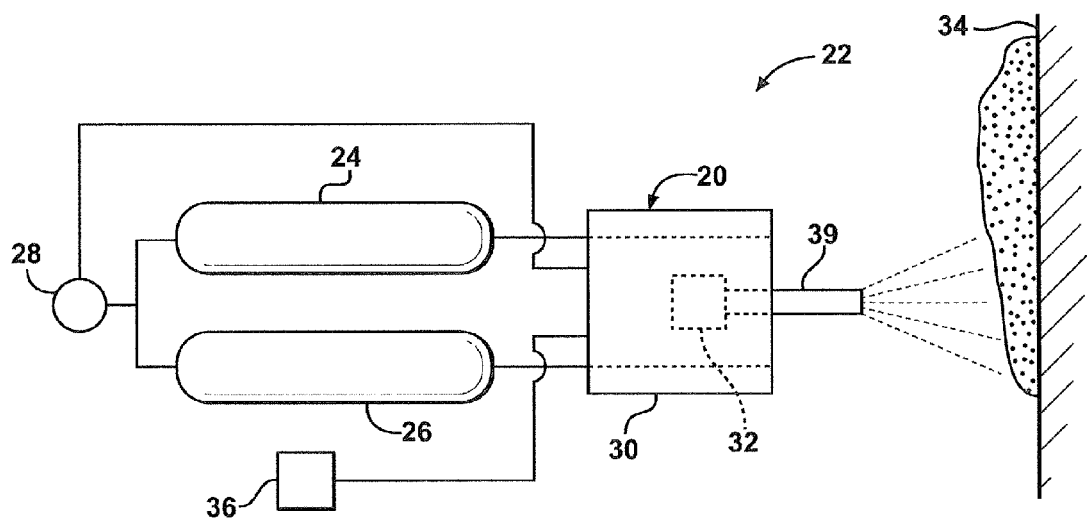
FIG. 2 is a schematic diagram of a pressurized two component foam dispensing system.

The foam dispensing apparatus 20 is part of a foam dispensing system shown generally at 22 in FIG. 2. Referring to FIG. 2, the foam dispensing system 22 includes a two component system 22 comprising a first fluid and a second fluid. As described herein, the first fluid includes an isocyanate component and the second fluid includes a resin component. However, it should be appreciated that the first fluid may alternatively include the resin component and the second fluid may alternatively include the isocyanate component. The resin component reacts with the isocyanate component to form a polyurethane foam. It should be appreciated that the resin component and the isocyanate component may include foaming agents, curing agents, catalysts, accelerators, as well as other modifying additives. It should also be appreciated that the first fluid and the second fluid may include materials other than the resin component and the isocyanate component described herein. For example, the first fluid may include an adhesive and the second fluid may include water.

The isocyanate component may include, but is not limited to, isocyanates, diisocyanates, polyisocyanates, biurets of isocyanates and polyisocyanates, isocyanurates of isocyanates and polyisocyanates, and combinations thereof. In one embodiment, the isocyanate component includes an n-functional isocyanate, wherein "n" may be a number from 2 to 5, from 2 to 4, or from 3 to 4. It is to be understood that "n" may be an integer or may have intermediate values from 2 to 5. The isocyanate component may include an isocyanate selected from the group of aromatic isocyanates, aliphatic isocyanates, and combinations thereof. In another embodiment, the isocyanate component includes an aliphatic isocyanate such as hexamethylene diisocyanate, H12MDI, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate component may include an aromatic isocyanate. If the isocyanate component includes an aromatic isocyanate, the aromatic isocyanate may correspond to the formula $R'(NCO)_z$ wherein R' is aromatic and z is an integer that corresponds to the valence of R'. Preferably, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethylolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof.

The isocyanate component may have any % NCO content and any viscosity. The isocyanate component may also react with the polyol and/or chain extender in any amount, as determined by one skilled in the art. Preferably, the isocyanate component and the polyol and/or chain extender are reacted at an isocyanate index from 15 to 900, more preferably from 95 to 130, and alternatively from 105 to 130.

The resin component of the subject invention may include a polyol component. More specifically, the polyol component may include one or more of a polyether polyol, a polyester polyol, and combinations thereof. As is known in the art, polyether polyols are typically formed from a reaction of an initiator and an alkylene oxide. Preferably, the initiator is selected from the group of aliphatic initiators, aromatic initiators, and combinations thereof. In one embodiment, the initiator is selected from the group of ethylene glycol, propylene glycol, dipropylene glycol, butylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), thiodiglycol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, propylene diamine, butylene diamine, hexamethylene diamine, cyclohexalene diamine, phenylene diamine, tolylene diamine, xylylene diamine, 3,3'-dichlorobenzidine, 3,3'- and dinitrobenzidine, alkanol amines including ethanol amine, aminopropyl alcohol, 2,2-dimethyl propanol amine, 3-aminocyclohexyl alcohol, and p-aminobenzyl alcohol, and combinations thereof. It is contemplated that any suitable initiator known in the art may be used in the present invention.

Preferably, the alkylene oxide that reacts with the initiator to form the polyether polyol is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. More preferably, the alkylene oxide is selected from the group of ethylene oxide, propylene oxide, and combinations thereof. Most preferably, the alkylene oxide includes ethylene oxide. However, it is also contemplated that any suitable alkylene oxide that is known in the art may be used in the present invention.

The polyether polyol may include an ethylene oxide cap of from 5 to 20% by weight based on the total weight of the polyester polyol. It is to be understood that the terminology "cap" refers to a terminal portion of the polyether polyol. Without intending to be bound by any particular theory, it is believed that the ethylene oxide cap promotes an increase in a rate of the reaction of the polyether polyol and the isocyanate.

The polyether polyol may also have a number average molecular weight of from 18 to 10,000 g/mol. Further, the polyether polyol may have a hydroxyl number of from 15 to 6,250 mg KOH/g. The polyether polyol may also have a nominal functionality of from 2 to 8. Further, the polyether polyol may also include an organic functional group selected from the group of a carboxyl group, an amine group, a carbamate group, an amide group, and an epoxy group.

Referring now to the polyester polyols introduced above, the polyester polyols may be produced from a reaction of a dicarboxylic acid and a glycol having at least one primary hydroxyl group. Suitable dicarboxylic acids may be selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Suitable glycols include, but are not limited to, those described above.

The polyester polyol may also have a number average molecular weight of from 80 to 1,500 g/mol. Further, the polyester polyol may have a hydroxyl number of from 40 to 600 mg KOH/g. The polyester polyol may also have a nominal functionality of from 2 to 8. Further, the polyester polyol may also include an organic functional group selected from the group of a carboxyl group, an amine group, a carbamate group, an amide group, and an epoxy group.

As shown in FIG. 2, the first fluid is stored in a first tank 24 and the second fluid is stored in a second tank 26. The first tank 24 and the second tank 26 are connected to a pressurized gas source 28 containing a pressurized gas. As discussed herein, the pressurized gas includes nitrogen. However, it should be appreciated that the pressurized gas may include a gas other than nitrogen. Accordingly, the pressurized gas pressurizes the first tank 24 and the second tank 26.

The foam dispensing apparatus 20 is connected to the first tank 24 and the second tank 26 by a series of hoses, pipes, pipefittings and/or connections. More specifically, the foam dispensing apparatus 20 includes a manifold assembly 30 mounted to a dispensing head 32, with the first tank 24 and the second tank 26 connected to and supplying the manifold assembly 30. The manifold assembly 30 is connected to and supplies the dispensing head 32 with the first fluid and the second fluid. The dispensing head 32 mixes the first fluid and the second fluid together to form a mixture of the first fluid and the second fluid, and dispenses the mixture of the first fluid and the second fluid onto a substrate 34 to form a polyurethane foam.

The manifold assembly 30 may further be connected to the pressurized gas source 28. Alternatively, the manifold assembly 30 may be connected to a different source of pressured gas other than the pressurized gas source 28, such as pressurized plant air. The manifold assembly 30 supplies the pressurized gas to the dispensing head 32 to entrain the gas within the mixture of the first fluid and the second fluid to assist in the formation of the polyurethane foam. Additionally, the pressurized gas is utilized to expel, i.e., flush or blow out, any residual of the first fluid and/or the second fluid from within the dispensing head 32.

A cleansing fluid source 36 containing a cleansing fluid is further connected to the manifold assembly 30. As discussed herein, the cleansing fluid includes water. However, it should be appreciated that the cleansing fluid may include some other material. The manifold assembly 30 supplies the cleansing fluid to the dispensing head 32 for purging, i.e., flushing, any of the first fluid and the second fluid from the dispensing head 32 after use, thereby cleaning the dispensing head 32 and ensuring proper functioning of the dispensing head 32 during future uses.

Figure 3:
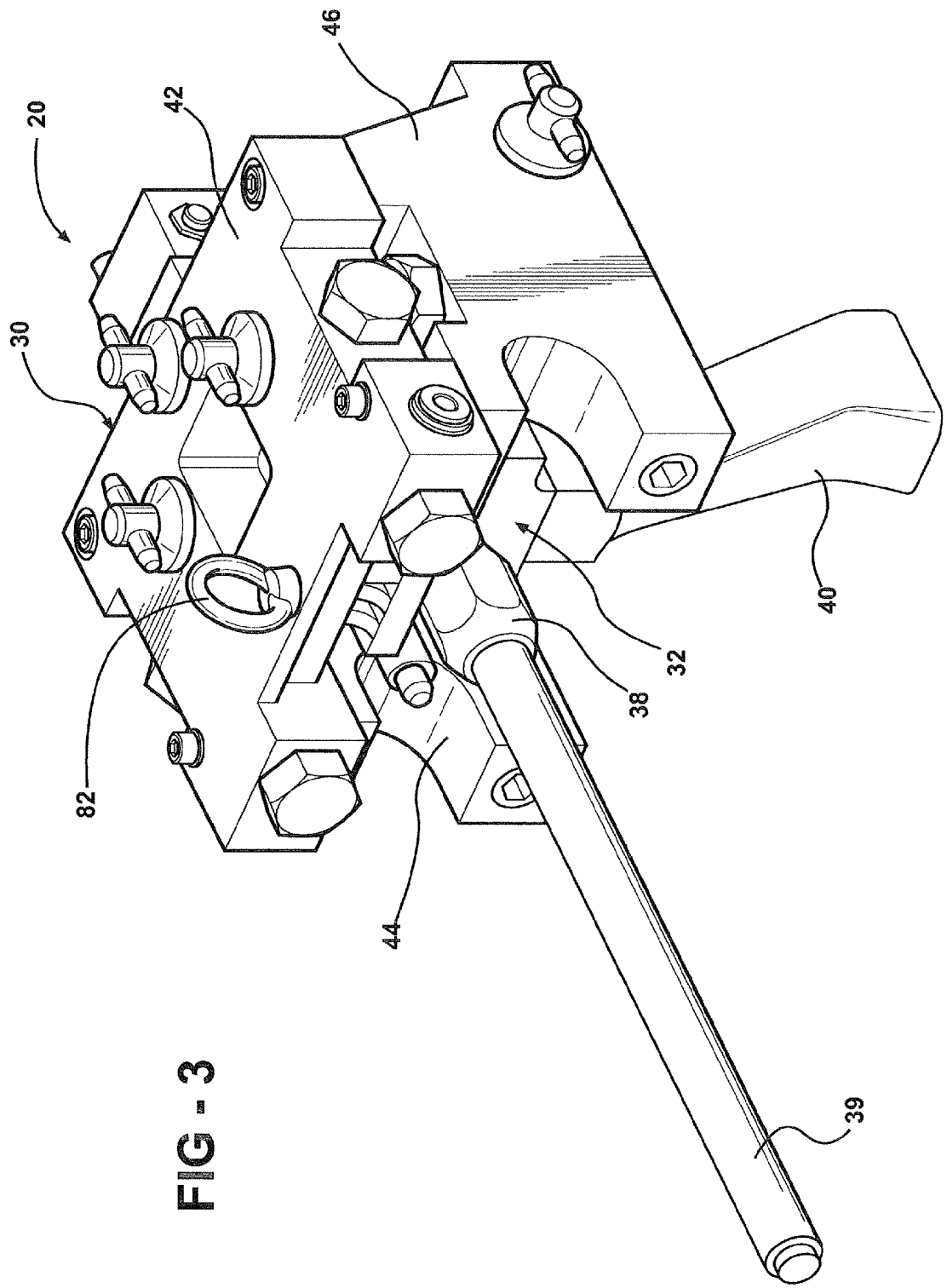
FIG. 3 is a perspective view of a foam dispensing apparatus in accordance with the subject invention.

Referring to FIG. 3, the foam dispensing apparatus is shown generally at 20. As described above, the foam dispensing apparatus 20 includes the dispensing head 32. The dispensing head 32 mixes the first fluid and the second fluid and dispenses the mixture onto the substrate 34 via a nozzle 38 and a mix tube 39. There are many suitable dispensing heads 32 known in the art suitable for use in a two component foam dispensing system 22 which may be utilized in accordance with the subject invention. Preferably, the dispensing head 32 includes a handle 40. The handle 40 extends from the dispensing head 32 for a user to grasp. The handle 40 permits the user to conveniently and easily manipulate and operate the dispensing head 32.

Figure 4:
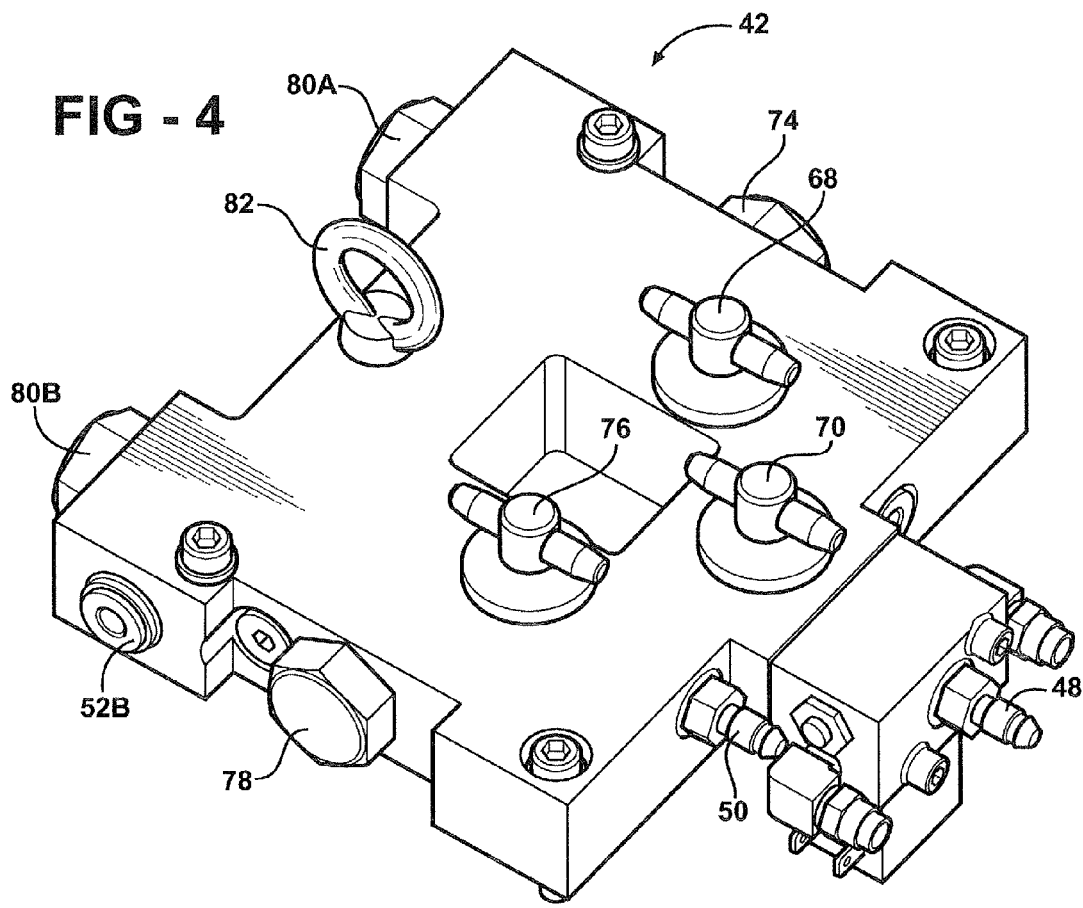
FIG. 4 is a perspective view of a purge portion of a manifold assembly of the foam dispensing apparatus.
Figure 5:
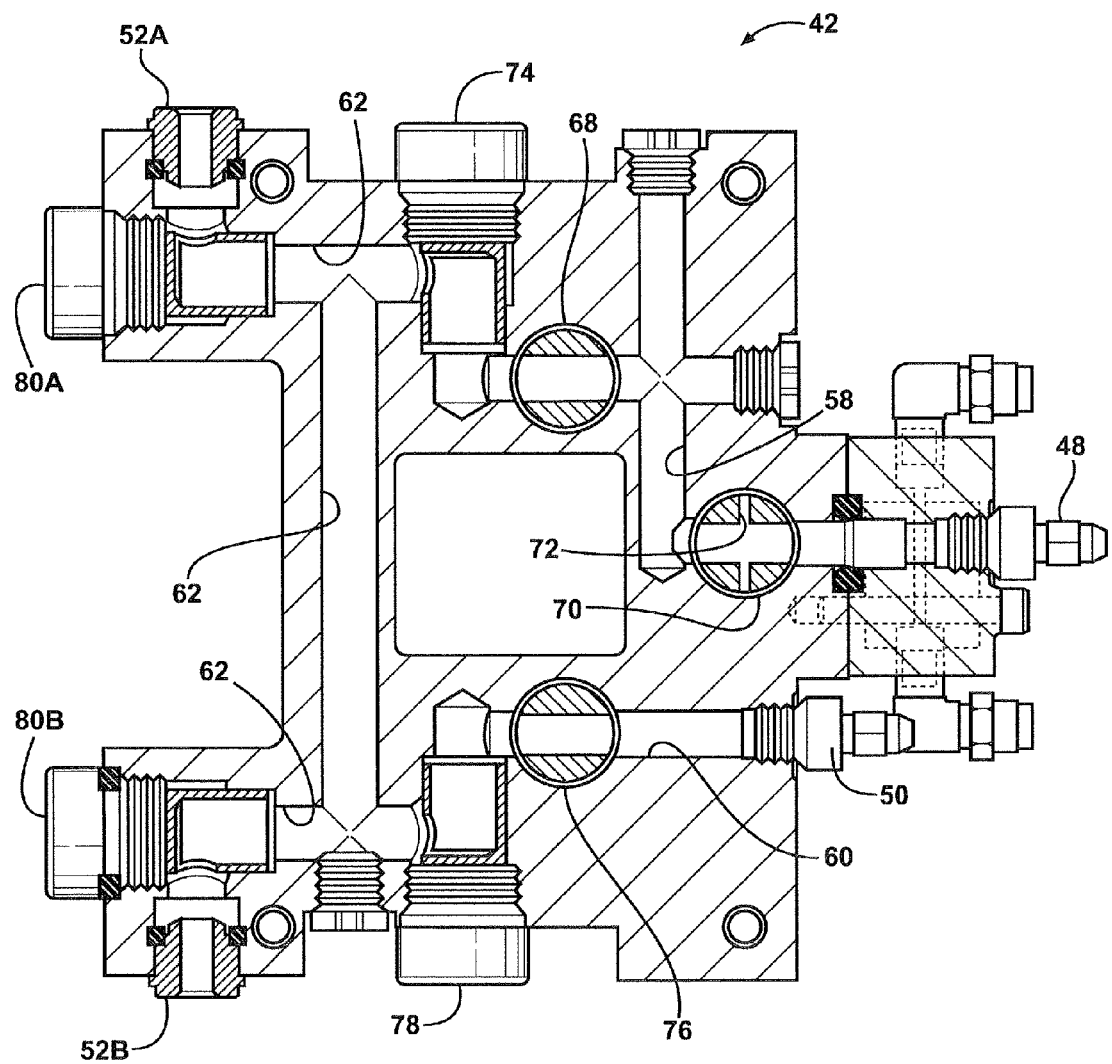
FIG. 5 is a top cross sectional view of the purge portion of the manifold assembly.

As described above, the manifold assembly 30 is mounted to the dispensing head 32. Referring to FIGS. 4 and 5, the manifold assembly 30 comprises a purge portion 42, a first supply portion 44 and a second supply portion 46. As shown in the Figures, the purge portion 42 of the manifold assembly 30, the first supply portion 44 of the manifold assembly 30 and the second supply portion 46 of the manifold assembly 30 are separable from each other. However, it should be appreciated that the purge portion 42, the first supply portion 44 and the second supply portion 46 may be integrally formed together as a single unit.

The purge portion 42 defines a gas inlet 48, a cleansing fluid inlet 50 and an outlet 52. The gas inlet 48 is in fluid communication with the pressurized gas source 28. The cleansing fluid inlet 50 is in fluid communication with the cleansing fluid source 36. The outlet 52 is in fluid communication with the dispensing head 32. As shown, the gas inlet 48 and the cleansing fluid inlet 50 each include a single inlet, whereas the outlet 52 includes a first outlet 52A and a second outlet 52B. However, it should be appreciated that the gas inlet 48 and the cleansing fluid inlet 50 may each include multiple inlets, and the outlet 52 may alternatively only include a single outlet. The purge portion 42 further defines a plurality of passageways 58, 60, 62 interconnecting the gas inlet 48, the cleansing fluid inlet 50 and the outlet 52. The gas inlet 48, the cleansing fluid inlet 50, the outlet 52 and the plurality of passageways 58, 60, 62 interconnecting the gas inlet 48, the cleansing fluid inlet 50 and the outlet 52 supply the pressurized gas to the dispensing head 32 for entrainment into the mixture of the first fluid and the second fluid, and supply the cleansing fluid to the dispensing head 32 for purging the dispensing head 32.

The plurality of passageways 58, 60, 62 defined by the purge portion 42 includes a gas passageway 58, a cleansing fluid passageway 60 and a combined passageway 62. The gas passageway 58 interconnects the gas inlet 48 and the outlet 52. The cleansing fluid passageway 60 interconnects the cleansing fluid inlet 50 and the outlet 52. The combined passageway 62 interconnects the gas passageway 58 and the cleansing fluid passageway 60 with the outlet 52. It should be appreciated that the shape, configuration and orientation of the purge portion 42 and the plurality of passageways 58, 60, 62 defined by the purge portion 42 may vary from that shown and described herein.

A gas control valve 68 is mounted to the purge portion 42. The gas control valve 68 partially defines the gas passageway 58, and controls a fluid flow rate between the gas inlet 48 and the outlet 52. The gas control valve 68 is operable between an "ON" position and an "OFF" position. The ON position permits fluid communication between the gas inlet 48 and the outlet 52, and the OFF position prevents fluid communication between the gas inlet 48 and the outlet 52. Accordingly, the flow of the pressurized gas to the dispensing head 32 is completely disrupted, i.e., stopped, when the gas control valve 68 is in the OFF position.

A gas regulator valve 70 is mounted to the purge portion 42. The gas regulator valve 70 partially defines the gas passageway 58 and regulates the fluid flow rate between the gas inlet 48 and the outlet 52. The gas regulator valve 70 is operable between an "ON" position and an "OFF" position. The gas regulator valve 70 includes a continuous flow orifice 72 permitting fluid communication at a pre-determined flow rate through the gas regulator valve 70 when the gas regulator valve 70 is in the OFF position, i.e., in a closed position. Accordingly, even when the gas regulator valve 70 is in the OFF position, a continuous flow of the pressurized gas flows through the continuous flow orifice 72 into the gas passageway 58. The gas regulator valve 70 is disposed along the gas passageway 58 nearer the gas inlet 48 than the gas control valve 68. As such, the pressurized gas enters the gas inlet 48 and flows through the gas regulator valve 70 prior to encountering the gas control valve 68.

A gas check valve 74 is mounted to the purge portion 42. The gas check valve 74 partially defines the gas passageway 58. The gas check valve 74 permits fluid communication from the gas inlet 48 to the outlet 52, and prevents fluid communication from the outlet 52 to the gas inlet 48. The gas check valve 74 is disposed along the gas passageway 58 between the outlet 52 and the gas control valve 68, thereby preventing backflow into the gas passageway 58.

A cleansing fluid control valve 76 is mounted to the purge portion 42. The cleansing fluid control valve 76 partially defines the cleansing fluid passageway 60 and controls a fluid flow rate between the cleansing fluid inlet 50 and the outlet 52. The cleansing fluid control valve 76 is operable between an "ON" position and an "OFF" position. The ON position permits fluid communication between the cleansing fluid inlet 50 and the outlet 52 and the OFF position prevents fluid communication between the cleansing fluid inlet 50 and the outlet 52. Accordingly, the flow of the cleansing fluid to the dispensing head 32 is completely disrupted, i.e., stopped, when the cleansing fluid control valve 76 is in the OFF position.

A cleansing fluid check valve 78 is mounted to the purge portion 42. The cleansing fluid check valve 78 partially defines the cleansing fluid passageway 60. The cleansing fluid check valve 78 permits fluid communication from the cleansing fluid inlet 50 to the outlet 52, and prevents fluid communication from the outlet 52 to the cleansing fluid inlet 50. The cleansing fluid check valve 78 is disposed along the cleansing fluid passageway 60 between the outlet 52 and the cleansing fluid control valve 76, thereby preventing backflow into the cleansing fluid passageway 60.

An outlet check valve 80 is mounted to the purge portion 42. The outlet check valve 80 is disposed adjacent the outlet 52. The outlet check valve 80 partially defines the combined passageway 62. The combined passageway 62 interconnects the gas passageway 58 and the cleansing fluid passageway 60. Accordingly, the combined passageway 62 connects the outlet 52 with both the gas passageway 58 and the cleansing fluid passageway 60. The combined passageway 62 is disposed between the outlet 52, the gas check valve 74 and the cleansing fluid check valve 78. Accordingly, in this orientation, no cross contamination between the pressurized gas and the cleansing fluid is allowed. The outlet check valve 80 permits fluid communication from the plurality of passageways 58, 60, 62 to the outlet 52, and prevents fluid communication from the outlet 52 into the plurality of passageways 58, 60, 62 and more specifically prevents fluid communication from the outlet 52 to the combined passageway 62.

As shown, the outlet check valve 80 includes a first outlet check valve 80A disposed adjacent the first outlet 52A and a second outlet check valve 80B disposed adjacent the second outlet 52B. However, it should be appreciated that there will be an outlet check valve 80 disposed adjacent each outlet 52, regardless of the total number of outlets 52.

A hanger 82 is attached to the purge portion 42. The hanger 82 supports the foam dispensing apparatus 20. As shown, the hanger 82 includes an eyebolt attached to the purge portion 42 of the manifold assembly 30. However, it should be appreciated that the hanger 82 may include other devices capable of supporting the foam dispensing apparatus 20.

Figure 6:
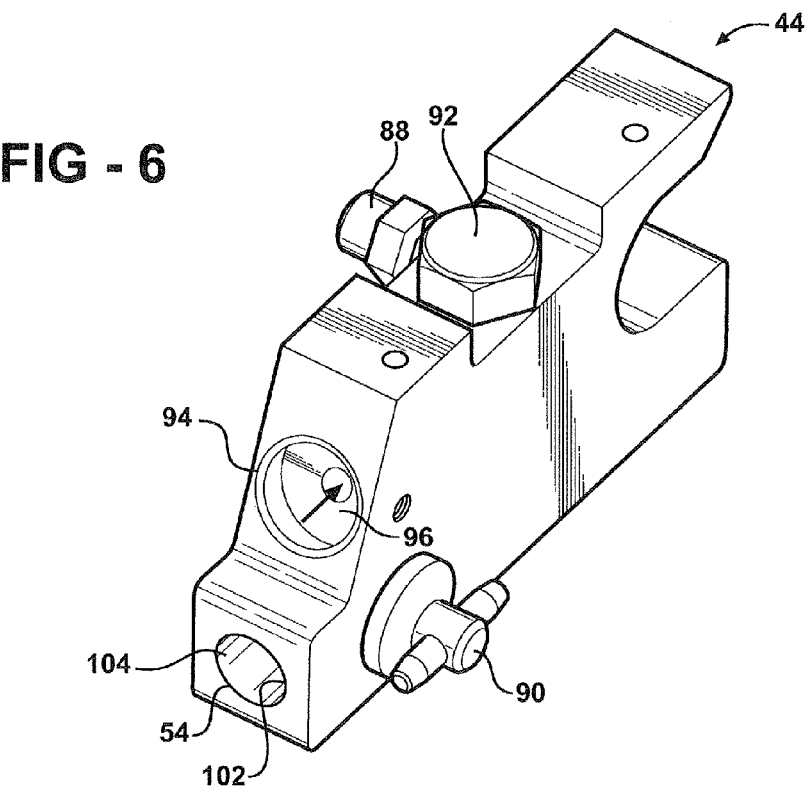
FIG. 6 is a perspective view of a first supply portion of the manifold assembly of the foam dispensing apparatus.
Figure 7:
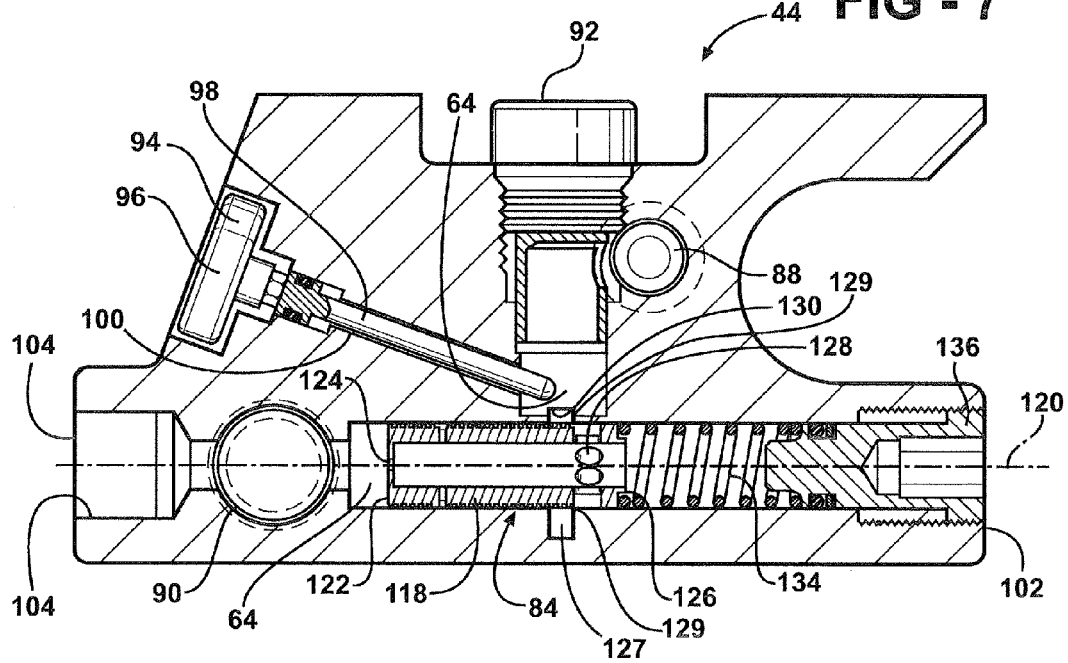
FIG. 7 is a side cross sectional view of the first supply portion of the manifold assembly.

Referring to FIGS. 6 and 7, the first supply portion 44 is mounted to the purge portion 42. The first supply portion 44 defines a first material inlet 54, a first material outlet 88 and a first fluid passageway 64. The first material inlet 54 is in fluid communication with the first tank 24 and receives the first fluid from the first tank 24. The first material outlet 88 is coupled to the dispensing head 32 and supplies the dispensing head 32 with the first fluid. The first fluid passageway 64 interconnects the first material inlet 54 and the first material outlet 88.

A first fluid control valve 90 is mounted to the first supply portion 44. The first fluid control valve 90 partially defines the first fluid passageway 64, and controls a fluid flow rate between the first material inlet 54 and the first material outlet 88. The first fluid control valve 90 is operable between and "ON" position and an "OFF" position. The ON position permits fluid communication between the first material inlet 54 and the first material outlet 88. The OFF position prevents fluid communication between the first material inlet 54 and the first material outlet 88. Accordingly, the flow of the first fluid to the dispensing head 32 is completely disrupted, i.e., stopped, when the first fluid control valve 90 is in the OFF position. It should be appreciated that the first fluid control valve 90 may be omitted from the first supply portion 44.

A first fluid check valve 92 is mounted to the first supply portion 44. The first fluid check valve 92 partially defines the first fluid passageway 64. The first fluid check valve 92 permits fluid communication from the first material inlet 54 to the first material outlet 88, and prevents fluid communication from the first material outlet 88 to the first material inlet 54.

Accordingly, the first fluid check valve 92 prevents backflow from the foam dispensing apparatus 20 back to the first tank 24.

A first thermometer 94 is mounted to the first supply portion 44. The first thermometer 94 extends into the first fluid passageway 64 for sensing a temperature of the first fluid. The first thermometer 94 includes a gauge portion 96 and a probe portion 98. The gauge portion 96 of the first thermometer 94 is disposed on an exterior surface of the first supply portion 44 to permit viewing thereof. The probe portion 98 of the first thermometer 94 extends from the gauge portion 96 through a channel 100 defined by the first supply portion 44 into the first fluid passageway 64.

The first supply portion 44 defines a first opening 102 and a first bore 104 extending from the first opening 102. The first bore 104 partially defines the first fluid passageway 64. A first flow control device 84 is disposed within the first bore 104 of the first supply portion 44. The first flow control device 84, described in greater detail below, regulates a fluid flow rate between the first material inlet 54 and the first material outlet 88.

Figure 8:
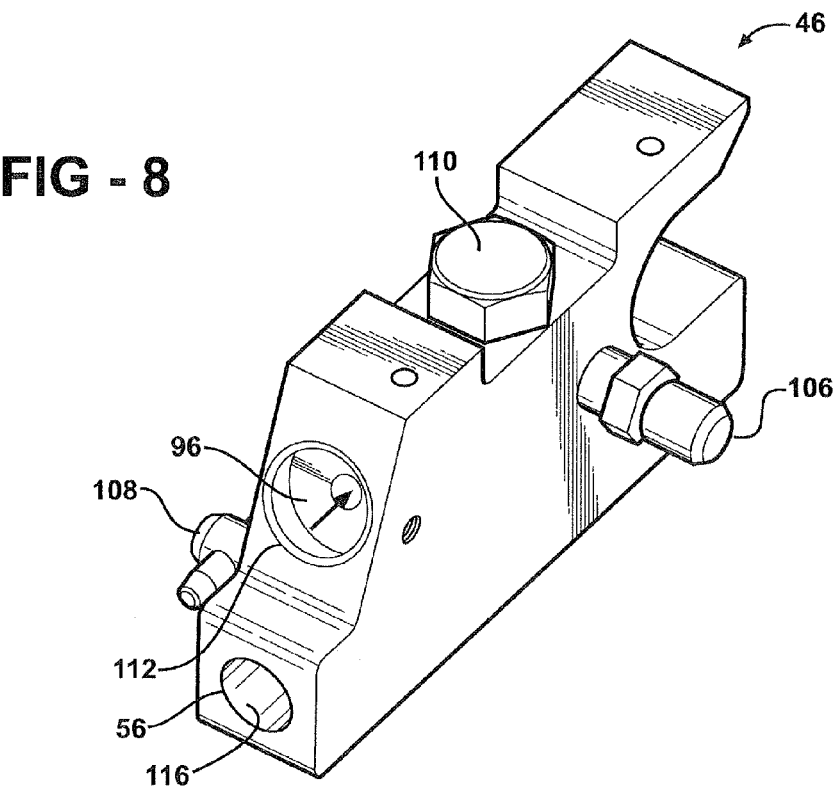
FIG. 8 is a perspective view of a second supply portion of the manifold assembly of the foam dispensing apparatus.
Figure 9:
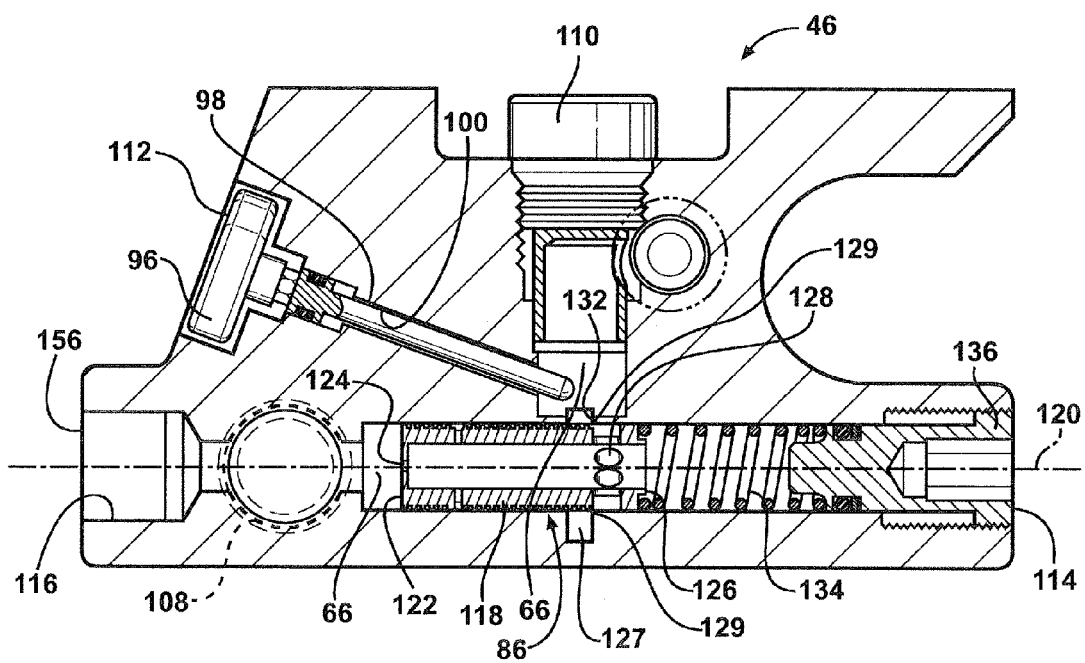
FIG. 9 is a side cross sectional view of the second supply portion of the manifold assembly.

The second supply portion 46 of the manifold assembly 30 is a mirror image of the first supply portion 44. Referring to FIGS. 8 and 9, the second supply portion 46 is mounted to the purge portion 42. The second supply portion 46 defines a second material inlet 56, a second material outlet 106 and a second fluid passageway 66. The second material inlet 56 is in fluid communication with the second tank 26 and receives the second fluid from the second tank 26. The second material outlet 106 is coupled to the dispensing head 32 and supplies the dispensing head 32 with the second fluid. The second fluid passageway 66 interconnects the second material inlet 56 and the second material outlet 106.

A second fluid control valve 108 is mounted to the second supply portion 46. The second fluid control valve 108 partially defines the second fluid passageway 66, and controls a fluid flow rate between the second material inlet 56 and the second material outlet 106. The second fluid control valve 108 is operable between an "ON" position and an "OFF" position. The ON position permits fluid communication between the second material inlet 56 and the second material outlet 106. The OFF position prevents fluid communication between the second material inlet 56 and the second material outlet 106. Accordingly, the flow of the second fluid to the dispensing head 32 is completely disrupted, i.e., stopped, when the second fluid control valve 108 is in the OFF position. It should be appreciated that the second fluid control valve 108 may be omitted from the second supply portion 46.

A second fluid check valve 110 is mounted to the second supply portion 46. The second fluid check valve 110 partially defines the second fluid passageway 66. The second fluid check valve 110 permits fluid communication from the second material inlet 56 to the second material outlet 106, and prevents fluid communication from the second material outlet 106 to the second material inlet 56. Accordingly, the second fluid check valve 110 prevents backflow from the foam dispensing apparatus 20 back to the second tank 26.

A second thermometer 112 is mounted to the second supply portion 46. The second thermometer 112 extends into the second fluid passageway 66 for sensing a temperature of the second fluid. The second thermometer 112 includes a gauge portion 96 and a probe portion 98. The gauge portion 96 of the second thermometer 112 is disposed on an exterior surface of the second supply portion 46 to permit viewing thereof. The probe portion 98 of the second thermometer 112 extends from the gauge portion 96 through a channel 100 defined by the second supply portion 46 into the second fluid passageway 66.

The second supply portion 46 defines a second opening 114 and a second bore 116 extending from the second opening 114. The second bore 116 partially defines the second fluid passageway 66. A second flow control device 86 is disposed within the second bore 116 of the second supply portion 46. The second flow control device 86, described in greater detail below, regulates a fluid flow rate between the second material inlet 56 and the second material outlet 106.

The first flow control device 84 and the second flow control device 86 are identical and will now be defined simultaneously with reference to FIGS. 7 and 9, with the first flow control device 84 being shown in FIG. 7 and the second flow control device 86 being shown in FIG. 9. The first flow control device 84 and the second flow control device 86 each include a piston 118 disposed and moveable within the first bore 104 and the second bore 116 respectively. The pistons 118 are moveable along a control axis 120. The pistons 118 include a first end 122 defining an aperture 124 and a second end 126 defining at least one orifice 128 in fluid communication with the aperture 124.

The first ends 122 of the pistons 118 are disposed adjacent the first material inlet 54 and the second material inlet 56 respectively. The second ends 126 of the pistons 118 are disposed opposite the first ends 122 along the control axis 120. The apertures 124 of the pistons 118 include a predetermined cross-sectional area for regulating the fluid flow rate of the first fluid and the second fluid. Preferably, the apertures 124 include a circular cross section having a predetermined diameter. However, it should be appreciated that the cross sectional shape of the apertures 124 may vary, and that it is the cross sectional area, the depth and the contour of the leading and lagging edges that determines the fluid flow rate through the pistons 118 of the first flow control device 84 and the second flow control device 86.

The first fluid passageway 64 defines a first port 130 in fluid communication with the at least one orifice 128 of the piston 118 disposed within the first bore 104. The second fluid passageway 66 defines a second port 132 in fluid communication with the at least one orifice 128, but normally all of the orifices 128, of the piston 118 disposed within the second bore 116. The interface between an annular flow path 129 around all of the orifices 128 relative to the first port 130 and the second port 132, respectively, defines a variable valve orifice 129. The variable valve orifice 129 created by the position of the annular flow path 127 relative to the first port 130 and the second port 132, respectively, in the first flow control device 84 and the second flow control device 86 respectively, may be defined by a complete an uninterrupted ring whereas other devices typically utilize at least one partially blocked orifice usually placed radially around the circumference. Utilizing the complete ring shaped variable orifice 129 maximizes the flow area for a give stroke, decreases the travel required to adjust the variable valve orifice 129 and therefore increases the sensitivity of the first flow control device 84 and the second flow control device 86. Accordingly, the first fluid and the second fluid flow through the apertures 124 and the orifices 128 of the pistons 118 within the first bore 104 and the second bore 116 respectively a through the variable valve orifice 129 and through the first port 130 and the second port 132 of the first fluid passageway 64 and the second fluid passageway 66 respectively.

The first flow control device 84 and the second flow control device 86 each include a spring 134 disposed within the first bore 104 and the second bore 116 respectively. The springs 134 abut the pistons 118 disposed within the first bore 104 and the second bore 116 respectively. The springs 134 apply a force to the pistons 118 and therefore across the aperture 124 of the pistons 118 thus creating a fixed controlled pressure drop across aperture 124 while the variable valve orifice 129 adjusts to maintain a constant fluid flow rate therebetween. As the fluid flow rate tries to increase, the pressure drop across aperture 124 increases thus creating a force against the piston 118. The increased fore compresses the spring 134 and closes off the variable valve orifice 129 by minute movement of the piston 118 thus creating additional restriction and maintaining a constant flow rate.

The first flow control device 84 and the second flow control device 86 each include a head 136 in threaded engagement with the first bore 104 and the second bore 116 respectively. The heads 136 compress the spring 134 disposed within the first bore 104 and the second bore 116 respectively in response to threaded movement of the heads 136 within the first bore 104 and the second bore 116 respectively. Accordingly, adjustment of the springs 134 adjusts the force against the pistons 118 and proportionally the pressure drop across the apertures 124. Moving, i.e., realigning, the pistons 118 relative to the first port 130 and the second port 132 through which the first fluid and the second fluid flow respectively, alters the cross sectional area between the variable valve orifice 129. Altering the cross sectional area of the variable valve orifice 129 thereby adjusts the pressure drop across the variable valve orifice 129. It should be appreciated that the first flow control device 84 and the second flow control device 86 are adjustable, i.e., tunable, through the first opening 102 and the second opening 114 respectively, by threading the heads 136 into and out of the first bore 104 and the second bore 116 respectively.

The first flow control device 84 is removable from within the first bore 104 of the first supply portion 44 through the first opening 102. Likewise, the second flow control device 86 is removable from within the second bore 116 of the second supply portion 46 through the second opening 114. Accordingly, the pistons 118 and the springs 134 of the first flow control device 84 and the second flow control device 86 are replaceable or serviceable without disconnecting the foam dispensing apparatus 20 from any of the pipe fittings connecting the manifold assembly 30 to the first tank 130, the second tank 26 or the dispensing head 32. Similarly, the flow rate of the first flow control device 84 and the second flow control device 86 may be significantly altered by replacing the pistons 118 with a different piston 118 having a differently sized aperture 124, without disconnecting the manifold assembly 30 from the first tank 24, the second tank 26 or the dispensing head 32.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A foam dispensing apparatus for dispensing a mixture of a first fluid and a second fluid, said apparatus comprising:
a dispensing head for mixing the first fluid and the second fluid and dispensing the mixture onto a substrate;
a handle extending from said dispensing head for a user to grasp and manipulate to operate said dispensing head; and
a manifold assembly mounted to said dispensing head, said manifold assembly comprising:
a purge portion defining a gas inlet, a cleansing fluid inlet, an outlet in fluid communication with said dispensing head, and a plurality of passageways interconnecting said gas inlet, said cleansing fluid inlet and said outlet for supplying a gas and a cleansing fluid to said dispensing head;
a first supply portion mounted to said purge portion and defining a first material inlet for receiving the first fluid, a first material outlet coupled to said dispensing head for supplying said dispensing head with the first fluid and a first fluid passageway interconnecting said first material inlet and said first material outlet;
a second supply portion mounted to said purge portion and defining a second material inlet for receiving the second fluid, a second material outlet coupled to said dispensing head for supplying said dispensing head with the second fluid and a second fluid passageway interconnecting said second material inlet and said second material outlet;
said plurality of passageways including a gas passageway interconnecting said gas inlet and said outlet; and
a gas regulator valve mounted to said purge portion and partially defining said gas passageway for regulating the fluid flow rate between said gas inlet and said outlet;
said gas regulator valve including a continuous flow orifice permitting fluid communication at a pre-determined flow rate through said gas regulator valve when said gas regulator valve is in a closed position.

2. An apparatus as set forth in claim 1 further comprising a gas control valve mounted to said purge portion and partially defining said gas passageway for controlling a fluid flow rate between said gas inlet and said outlet.

3. An apparatus as set forth in claim 2 further comprising a gas check valve mounted to said purge portion and partially defining said gas passageway for permitting fluid communication from said gas inlet to said outlet and preventing fluid communication from said outlet to said gas inlet.

4. An apparatus as set forth in claim 1 wherein said plurality of passageways includes a cleansing fluid passageway interconnecting said cleansing fluid inlet and said outlet.

5. An apparatus as set forth in claim 4 further comprising a cleansing fluid control valve mounted to said purge portion and partially defining said cleansing fluid passageway for controlling a fluid flow rate between said cleansing fluid inlet and said outlet.

6. An apparatus as set forth in claim 5 further comprising a cleansing fluid check valve mounted to said purge portion and partially defining said cleansing fluid passageway for permitting fluid communication from said cleansing fluid inlet to said outlet and preventing fluid communication from said outlet to said cleansing fluid inlet.

7. An apparatus as set forth in claim 4 wherein said plurality of passageways includes a combined passageway interconnecting said gas passageway and said cleansing fluid passageway with said outlet.

8. An apparatus as set forth in claim 7 further comprising an outlet check valve mounted to said purge portion and disposed adjacent said outlet and partially defining said combined passageway for permitting fluid communication from said plurality of passageways to said outlet and preventing fluid communication from said outlet into said plurality of passageways.

9. An apparatus as set forth in claim 8 wherein said outlet includes a first outlet and a second outlet.

10. An apparatus as set forth in claim 9 wherein said outlet check valve includes a first outlet check valve disposed adjacent said first outlet and a second outlet check valve disposed adjacent said second outlet.

11. An apparatus as set forth in claim 1 further comprising a hanger attached to said purge portion for supporting said apparatus.

12. A foam dispensing apparatus for dispensing a mixture of a first fluid and a second fluid, said apparatus comprising:
a dispensing head for mixing the first fluid and the second fluid and dispensing the mixture onto a substrate;
a handle extending from said dispensing head for a user to grasp and manipulate to operate said dispensing head; and
a manifold assembly mounted to said dispensing head, said manifold assembly comprising:
a purge portion defining a gas inlet, a cleansing fluid inlet, an outlet in fluid communication with said dispensing head, and a plurality of passageways interconnecting said gas inlet, said cleansing fluid inlet and said outlet for supplying a gas and a cleansing fluid to said dispensing head;
a first supply portion mounted to said purge portion and defining a first material inlet for receiving the first fluid, a first material outlet coupled to said dispensing head for supplying said dispensing head with the first fluid and a first fluid passageway interconnecting said first material inlet and said first material outlet;
a second supply portion mounted to said purge portion and defining a second material inlet for receiving the second fluid, a second material outlet coupled to said dispensing head for supplying said dispensing head with the second fluid and a second fluid passageway interconnecting said second material inlet and said second material outlet;
a first fluid control valve mounted to said first supply portion and a second fluid control valve mounted to said second supply portion with said first fluid control valve partially defining said first fluid passageway for controlling a fluid flow rate between said first material inlet and said first material outlet and said second fluid control valve partially defining said second fluid passageway for controlling a fluid flow rate between said second material inlet and said second material outlet;
a first fluid check valve mounted to said first supply portion and a second fluid check valve mounted to said second supply portion with said first fluid check valve partially defining said first fluid passageway for permitting fluid communication from said first material inlet to said first material outlet and preventing fluid communication from said first material outlet to said first material inlet and with said second fluid check valve partially defining said second fluid passageway for permitting fluid communication from said second material inlet to said second material outlet and preventing fluid communication from said second material outlet to said second material inlet; and
a first thermometer mounted to said first supply portion and a second thermometer mounted to said second supply portion with said first thermometer extending into said first fluid passageway for sensing a temperature of the first fluid and said second thermometer extending into said second fluid passageway for sensing a temperature of the second fluid.

13. An apparatus as set forth in claim 12 wherein said first supply portion defines a first opening and a first bore extending from said first opening to partially define said first fluid passageway and wherein said second supply portion defines a second opening and a second bore extending from said second opening to partially define said second fluid passageway.

14. An apparatus as set forth in claim 13 further comprising a first flow control device disposed within said first bore of said first supply portion for regulating a fluid flow rate between said first material inlet and said first material outlet and further comprising a second flow control device disposed within said second bore of said second supply portion for regulating a fluid flow rate between said second material inlet and said second material outlet.

15. An apparatus as set forth in claim 14 wherein said first flow control device and said second flow control device each include a piston disposed and moveable within said first bore and said second bore respectively along a control axis with said piston including a first end defining an aperture and a second end defining at least one orifice in fluid communication with said aperture.

16. An apparatus as set forth in claim 15 wherein said first fluid passageway defines a first port in fluid communication with said at least one orifice of said piston disposed within said first bore and said second fluid passageway defines a second port in fluid communication with said at least one orifice of said piston disposed within said second bore.

17. An apparatus as set forth in claim 16 wherein said first flow control device and said second flow control device each include a spring disposed within said first bore and said second bore respectively and abutting said piston disposed within said first bore and said second bore respectively for moving said at least one orifice relative to said first port and said second port respectively to adjust a fluid flow rate therebetween.

18. An apparatus as set forth in claim 17 wherein said first flow control device and said second flow control device each include a head in threaded engagement with said first bore and said second bore respectively for moving said spring disposed within said first bore and said second bore respectively in response to threaded movement of said head within said first bore and said second bore respectively.

19. An apparatus as set forth in claim 18 wherein said first flow control device is removable from within said first bore of said first supply portion through said first opening and said second flow control device is removable from within said second bore of said second supply portion through said second opening.

20. An apparatus as set forth in claim 1 wherein said purge portion of said manifold assembly, said first supply portion of said manifold assembly and said second supply portion of said manifold assembly are separable from each other.

21. A manifold assembly for supplying a first fluid, a second fluid, a gas and a cleansing fluid to a foam dispensing head, said assembly comprising:
a purge portion defining an gas inlet, a cleansing fluid inlet, an outlet and a plurality of passageways interconnecting said gas inlet, said cleansing fluid inlet and said outlet for supplying the gas and the cleansing fluid to the dispensing head;
a first supply portion mounted to said purge portion and defining a first material inlet for receiving the first fluid, a first material outlet for supplying the first fluid to the dispensing head and a first fluid passageway interconnecting said first material inlet and said first material outlet;
a second supply portion mounted to said purge portion and defining a second material inlet for receiving the second fluid, a second material outlet for supplying the second fluid to the dispensing head and a second fluid passageway interconnecting said second material inlet and said second material outlet;

said plurality of passageways including a gas passageway interconnecting said gas inlet and said outlet; and a gas regulator valve mounted to said purge portion and partially defining said gas passageway for regulating the fluid flow rate between said gas inlet and said outlet;

said gas regulator valve including a continuous flow orifice permitting fluid communication at a pre-determined flow rate through said gas regulator valve when said gas regulator valve is in a closed position.

22. An apparatus as set forth in claim 21 further comprising a gas control valve mounted to said purge portion and partially defining said gas passageway for controlling a fluid flow rate between said gas inlet and said outlet.

23. An apparatus as set forth in claim 22 further comprising a gas check valve mounted to said purge portion and partially defining said gas passageway for permitting fluid communication from said gas inlet to said outlet and preventing fluid communication from said outlet to said gas inlet.

24. An apparatus as set forth in claim 21 wherein said plurality of passageways includes a cleansing fluid passageway interconnecting said cleansing fluid inlet and said outlet.

25. An apparatus as set forth in claim 24 further comprising a cleansing fluid control valve mounted to said purge portion and partially defining said cleansing fluid passageway for controlling a fluid flow rate between said cleansing fluid inlet and said outlet.

26. An apparatus as set forth in claim 25 further comprising a cleansing fluid check valve mounted to said purge portion and partially defining said cleansing fluid passageway for permitting fluid communication from said cleansing fluid inlet to said outlet and preventing fluid communication from said outlet to said cleansing fluid inlet.

27. An apparatus as set forth in claim 24 wherein said plurality of passageways includes a combined passageway interconnecting said gas passageway and said cleansing fluid passageway with said outlet.

28. An apparatus as set forth in claim 27 further comprising an outlet check valve mounted to said purge portion and disposed adjacent said outlet and partially defining said combined passageway for permitting fluid communication from said plurality of passageways to said outlet and preventing fluid communication from said outlet into said plurality of passageways.

29. An apparatus as set forth in claim 28 wherein said outlet includes a first outlet and a second outlet.

30. An apparatus as set forth in claim 29 wherein said outlet check valve includes a first outlet check valve disposed adjacent said first outlet and a second outlet check valve disposed adjacent said second outlet.

31. An apparatus as set forth in claim 21 further comprising a hanger attached to said purge portion for supporting said apparatus.

32. A manifold assembly for supplying a first fluid, a second fluid, a gas and a cleansing fluid to a foam dispensing head, said assembly comprising:

a purge portion defining an gas inlet, a cleansing fluid inlet, an outlet and a plurality of passageways interconnecting said gas inlet, said cleansing fluid inlet and said outlet for supplying the gas and the cleansing fluid to the dispensing head;

a first supply portion mounted to said purge portion and defining a first material inlet for receiving the first fluid, a first material outlet for supplying the first fluid to the dispensing head and a first fluid passageway interconnecting said first material inlet and said first material outlet;

a second supply portion mounted to said purge portion and defining a second material inlet for receiving the second fluid, a second material outlet for supplying the second fluid to the dispensing head and a second fluid passageway interconnecting said second material inlet and said second material outlet;

a first fluid control valve mounted to said first supply portion and a second fluid control valve mounted to said second supply portion with said first fluid control valve partially defining said first fluid passageway for controlling a fluid flow rate between said first material inlet and said first material outlet and said second fluid control valve partially defining said second fluid passageway for controlling a fluid flow rate between said second material inlet and said second material outlet;

a first fluid check valve mounted to said first supply portion and a second fluid check valve mounted to said second supply portion with said first fluid check valve partially defining said first fluid passageway for permitting fluid communication from said first material inlet to said first material outlet and preventing fluid communication from said first material outlet to said first material inlet and with said second fluid check valve partially defining said second fluid passageway for permitting fluid communication from said second material inlet to said second material outlet and preventing fluid communication from said second material outlet to said second material inlet; and a first thermometer mounted to said first supply portion and a second thermometer mounted to said second supply portion with said first thermometer extending into said first fluid passageway for sensing a temperature of the first fluid and said second thermometer extending into said second fluid passageway for sensing a temperature of the second fluid.

33. An apparatus as set forth in claim 32 wherein said first supply portion defines a first opening and a first bore extending from said first opening to partially define said first fluid passageway and wherein said second supply portion defines a second opening and a second bore extending from said second opening to partially define said second fluid passageway.

34. An apparatus as set forth in claim 33 further comprising a first flow control device disposed within said first bore of said first supply portion for regulating a fluid flow rate between said first material inlet and said first material outlet and further comprising a second flow control device disposed within said second bore of said second supply portion for regulating a fluid flow rate between said second material inlet and said second material outlet.

35. An apparatus as set forth in claim 34 wherein said first flow control device and said second flow control device each include a piston disposed and moveable within said first bore and said second bore respectively along a control axis with said piston including a first end defining an aperture and a second end defining at least one orifice in fluid communication with said aperture.

36. An apparatus as set forth in claim 35 wherein said first fluid passageway defines a first port in fluid communication with said at least one orifice of said piston disposed within said first bore and said second fluid passageway defines a second port in fluid communication with said at least one orifice of said piston disposed within said second bore.

37. An apparatus as set forth in claim 36 wherein said first flow control device and said second flow control device each include a spring disposed within said first bore and said second bore respectively and abutting said piston disposed within said first bore and said second bore respectively for moving said at least one orifice relative to said first port and said second port respectively to adjust a fluid flow rate therebetween.

38. An apparatus as set forth in claim 37 wherein said first flow control device and said second flow control device each include a head in threaded engagement with said first bore and said second bore respectively for moving said spring disposed within said first bore and said second bore respectively in response to threaded movement of said head within said first bore and said second bore respectively.

39. An apparatus as set forth in claim 38 wherein said first flow control device is removable from within said first bore of said first supply portion through said first opening and said second flow control device is removable from within said second bore of said second supply portion through said second opening.

40. An apparatus as set forth in claim 21 wherein said purge portion of said manifold assembly, said first supply portion of said manifold assembly and said second supply portion of said manifold assembly are separable from each other.

* * * * *